Feb. 12, 1935. H. J. MUTCHLER 1,990,611
TIRE OPENER
Filed Nov. 20, 1933
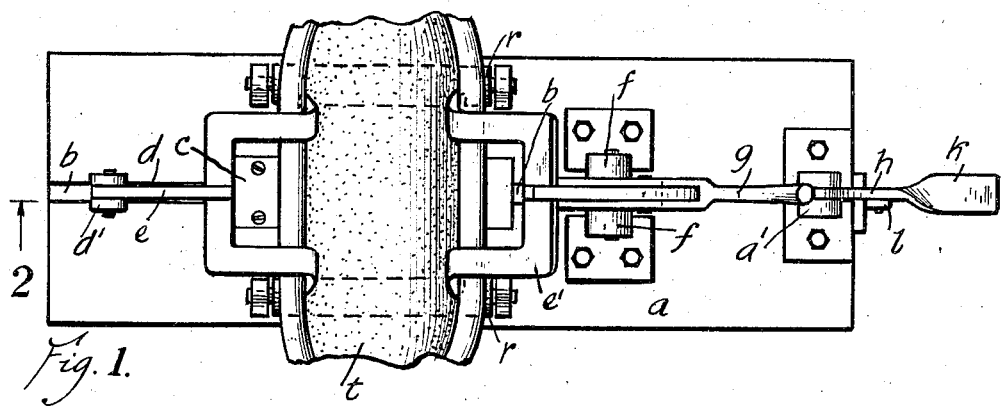
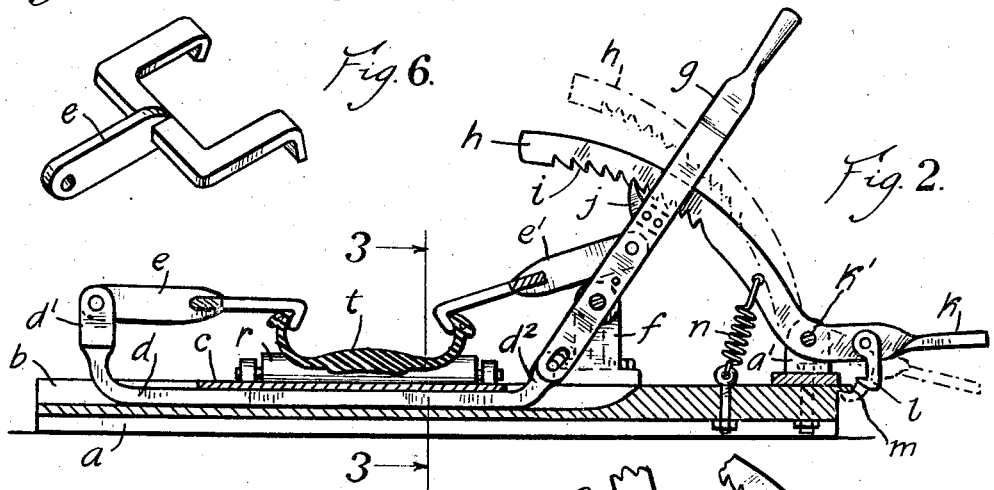
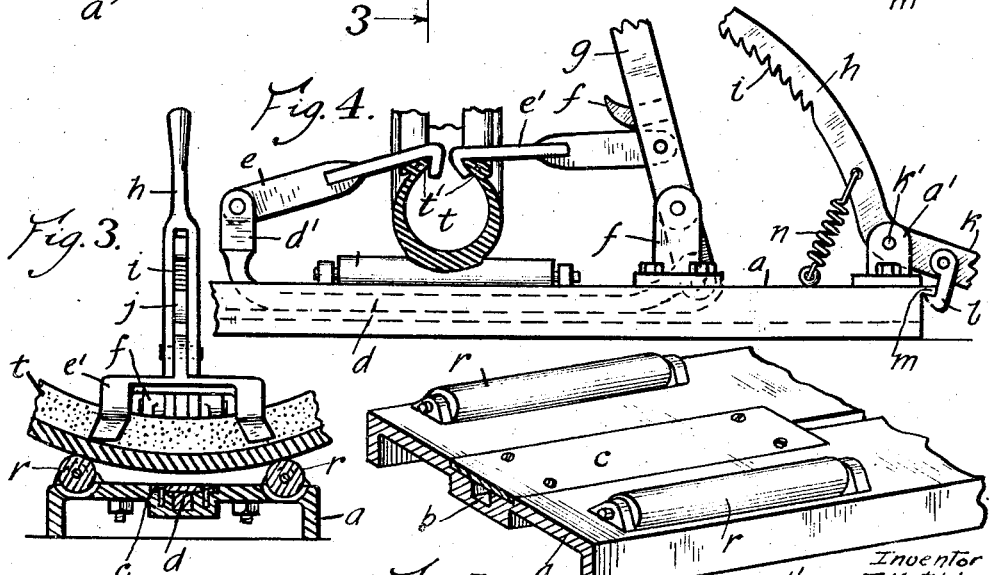
Inventor
Henry J. Mutchler Patented Feb. 12, 1935

1,990,611

UNITED STATES PATENT OFFICE 1,990,611

TIRE OPENER

Henry J. Mutchler, Stayton, Oreg.

Application November 20, 1933, Serial No. 698,845

7 Claims. (Cl. 152—27)

The object of my invention is to provide an easily applied, and used, device by which an automobile tire may be readily spread open and held open so as to get at its interior.

A further object of my invention is to provide a device in which the operating parts are so arranged as to facilitate the engaging and release of the opposite interior ribs of a tire.

A further object consists in so arranging the working parts that they are simple to make, and will operate to best advantage with a minimum exertion of muscular power.

A further object of my invention is to provide means for holding the tire spreading devices in place after having been operated to open the tire, thus facilitating work on the tire.

The foregoing objects and incidental features I attain by the device illustrated in the accompanying drawing and hereinafter described and claimed.

In the drawing:

Fig. 1 shows a top or plan view of my device showing the same as applied to hold a tire spread open;

Fig. 2 shows a longitudinal section elevation of my device, the section being taken approximately on the line 2 of Fig. 1 looking in the direction indicated by the arrow;

Fig. 3 shows a section on the line 3—3 of Fig. 2, looking in the direction indicated by the arrow;

Fig. 4 shows a fragmentary front elevation of my device, with reference to Fig. 2, showing my device as positioned when the interior ribs of the tire are initially engaged or about to be released; this figure also illustrates how the operating means may be placed and held in inactive position, thus releasing the tire engaging hooks, or means;

Fig. 5 shows a fragmentary sectional, perspective view of the left hand end of my device with respect to Figs. 1 and 2; and Fig. 6 shows details of one of the claw-like tire engaging hooks of my device.

The supporting base $a$ may be a casting provided with a groove $b$, covered by a plate $c$ to form a guideway in which to place a reciprocable bar $d$, preferably made with an upstanding end $d'$. To such upstanding end is pivoted a claw hook $e$. On the opposite end of the base $a$ is mounted a post $f$ on which is pivoted a lever $g$. To the lower end of this lever $g$ is pivoted the end $d2$ of the bar $d$, as more clearly shown by Fig. 2. To the lever $g$ is pivoted a companion claw hook $e'$. The lever $g$ is secured in variable angular positions by means of a locking bar $h$, pivoted at $k'$ to a lug $a'$ mounted on the base $a$.

The locking bar $h$ is provided with ratchet teeth $i$, and the lever $g$ is provided with a ratchet tooth $j$. The locking bar $h$ is normally held in active position by a spring $n$. The locking bar $h$ is preferably provided with an operating extension $k$, so that by depressing this extension the hook $l$ may be engaged with a lip $m$, as shown in Fig. 4, to hold the locking bar $h$ in inactive, disengaged position.

Since all tires are more or less heavy, I find it convenient to support the tire on rollers $r$, rotatably mounted on the base $a$, so as to facilitate the turning around, that is, revolving in place, of the tire while working on it, supported on my tire opener.

My tire opener operates as follows:

In the first place the locking bar $h$ is disengaged from the lever $g$, which is then moved inward, as illustrated by Fig. 4, thus bringing the companion hooks $e$ and $e'$ closely together, so that they may be readily inserted in the opening between the two interior ribs $t'$ of the tire, indicated by $t$. The lever $g$ is then moved outward, thus moving the reciprocable bar $d$ to the left, with respect to Figs. 1 and 2; thus moving the two hooks $e$, $e'$ apart, and thereby opening up the tire, as illustrated by Fig. 2.

When the work on the tire is completed, the locking bar $h$ may be released from its engagement with the lever $g$, and the lever then moved inward, thus causing the companion claw-hooks $e$ and $e'$ to be brought close together, back into the position in which shown in Fig. 3, and the hooks may then be readily removed from the tire.

While working on the tire it is readily turned around, that is revolved, on the supporting rollers $r$ as mentioned.

The described illustrations of my device illustrate what I believe to be the simplest and most practical form of my device, without limiting myself precisely to such form.

I claim:

1. A tire opener comprising a base provided with a guideway, a bar reciprocable in said guideway, means for reciprocating said bar, a hook carried by said reciprocating means adapted to be engaged with the interior edge of one side of a tire, a similar companion hook pivoted to one end of said reciprocable bar, means for securing said reciprocable bar in position holding the tire sides engaged by said hooks spread apart.

2. In a tire opener the combination of a base, a bar reciprocable on the base, means for reciprocating said bar, a hook operatively connected with said reciprocating means adapted to be engaged with the interior edge of one side of a tire, and a similar companion hook carried by said reciprocable bar.

3. In a tire opener the combination of a base provided with a longitudinal groove and a plate covering a part of such groove forming a guideway therewith, a bar reciprocable in said guideway, a lever pivoted on said base and connected to said bar for reciprocating the same, a hook carried by said lever adapted to be engaged with the interior edge of one side of a tire, a similar companion hook pivoted to one end of said reciprocable bar, a spring controlled locking bar pivoted to said base normally engaged with said lever.

4. The combination described by claim 3 including means for securing the locking bar disengaged from the lever.

5. The combination described by claim 3 in which the locking bar is provided with an operating extension and means engaging said extension means for securing said locking bar disengaged from said lever.

6. The combination described by claim 3 in which the lever and the locking bar are provided with tooth and ratchet engaging elements, respectively.

7. The combination described by claim 2 in which the reciprocable bar is provided with an upstanding end, and the hook for engaging the interior edge of one side of the tire is pivoted to such upstanding end, and in which means are provided for securing said reciprocable bar in position holding the tire sides engaged by said hooks spread apart.

HENRY J. MUTCHLER.